United States Patent Office 2,850,396
Patented Sept. 2, 1958

2,850,396
PROCESS OF PRODUCING POROUS BODIES

Karl Fischer, Ahrensburg, and Herbert Sydow, Hamburg, Germany

No Drawing. Application January 19, 1953
Serial No. 332,084

Claims priority, application Germany January 17, 1952

8 Claims. (Cl. 106—41)

The present invention relates to a process of producing porous bodies and more particularly to a process of producing solid inorganic porous bodies which are useful as catalysts, adsorbing agents, etc. and which bodies may be produced in suitable shapes such as spherical or lens-shaped bodies.

The production of porous bodies in spherical or lens-shaped bodies has been particularly desired for the use of such porous bodies as catalysts and adsorbing agents. It is desirable for such agents to have a large surface area and still to be in the form of a single coherent body. Generally the large surface area may be achieved by using finely divided particles of the inorganic substance. However, the formation of a coherent body was extremely difficult and particularly so in the case where it is desired that the porous body have a specific shape or form.

Processes were previously used, whereby the catalyst was mechanically treated by means of an extrusion press into cylindrical bodies. This method is however, extremely costly and the produced bodies did not have the desired characteristics. Other methods were also tried, however without noticeable success.

It is therefore an object of the present invention to provide a process of producing solid, porous bodies of substances such as inorganic catalysts.

It is also an object of the present invention to provide a process of forming solid porous inorganic bodies which process may be utilized for the formation of any type of inorganic porous bodies for any purpose whatsoever and by which process the porous bodies may be made in spherical or other desired shapes.

Other objects and advantages of the present invention will be apparent from the further reading of the specification and the appended claims.

With the above objects in view, the present invention mainly comprises a process of producing solid, porous bodies, comprising the steps of mixing at least one finely divided water-insoluble inorganic substance with an aqueous solution of at least one water-soluble alginic acid derivative so as to form a suspension of the inorganic substance in the aqueous solution of the alginic acid derivative, treating the thus formed mixture with a chemical agent transforming the alginic acid derivative into a water-insoluble alginate, thus forming a coherent mass of semi-solid water-insoluble alginate including therein particles of the finely divided water-insoluble inorganic substance, drying the coherent mass so as to form a granular body, and heating the granular body to a temperature above the combustion temperature of the insoluble alginate so as to burn-off the same and sinter together the particles of the finely divided inorganic substance, thus forming a solid porous body of the inorganic substance.

It is preferable according to the present invention that the mixture of aqueous solution of water-soluble alginic acid derivative and suspension of finely divided water-insoluble substance be dropped or sprayed into the chemical agent which is adapted to react with the water-soluble alginic acid derivative to form a water-insoluble alginate. The chemical agent will generally be in liquid, gaseous, vapor or mist form.

It is to be understood that the term "water-insoluble inorganic substance" also includes inorganic substances which can with water form a colloidal solution or sol. Such colloidal solution or sol may be considered as containing a water-insoluble substance since the colloidal particles in the sol are not actually dissolved but do remain as solid particles distributed in the liquid.

The water-soluble alginic acid derivatives which may be used according to the present invention include all water-soluble derivatives of alginic acid, such as soluble sodium, potassium, ammonium and other salts of alginic acid and also water-soluble organic derivatives of alginic acid such as esters and partial esters, i. e. methyl and ethyl esters of alginic acid. These water-soluble alginic acid derivatives are mainly soluble in water only to a limited degree, however it is to be understood that the term "water-soluble alginic acid derivative" includes these derivatives which are only partially soluble in water as opposed to derivatives of alginic acid which are practically completely insoluble in water, such as calcium alginate.

The term "aqueous solution of a water-soluble alginic acid derivative" is also meant to include such solutions wherein the concentration of the alginic acid derivative is so high as to form a semi-solid gel rather than a liquid solution. Such gels will generally be formed when the concentration of alginic acid derivative is greater than 5%.

The chemical agents which are utilized to transform the water-soluble alginic acid derivative to a water-insoluble alginate include most polyvalent metal ions and particularly the alkali earth metals such as calcium, barium, etc. and the heavy metals such as iron, etc. Other polyvalent metals include aluminum and the like. Chemical agents of this type are generally utilized in the form of an aqueous solution of a water-soluble salt of the metal. Any water-soluble salt may be utilized and the anion of the salt makes no difference to the process of the present invention so long as the salt is water-soluble. For example, chloride, acetate, sulphate, etc. are all equally suitable. These polyvalent precipitating metal ions may also be applied in the form of an alcoholic solution of the same rather than an aqueous solution. It is also possible to add the solid salts themselves directly to the suspension of the inorganic substance in the aqueous solution of the water-soluble alginic acid derivative.

The use of polyvalent metal ions is not the only means of forming a water-insoluble alginate from the alginic acid derivative. It is possible to treat the alginic acid derivative with an acid, such as a mineral acid to form a water-insoluble derivative. The mineral acid may be in dilute liquid form, in gaseous form or in the form of vapor or mist. It is to be noted that if the water-soluble alginic acid utilized is a soluble salt such as for example sodium alginate, the mineral acid will react with the sodium alginate to form relatively water-insoluble alginic acid, which may also be called hydrogen alginate. It is therefore apparent that the term "water-insoluble alginate" also includes alginic acid itself.

All the chemical agents, such as organic compounds which will react with the water-soluble alginic acid derivative to form a water-insoluble alginic acid derivative may be used, and the term "water-insoluble alginate" is meant to include any water-insoluble alginic acid compound formed by treatment of a water-soluble alginic acid derivative with a chemical agent according to the process of the present invention.

As stated above, the mixture of suspended particles of the water-insoluble inorganic substance suspended in the aqueous solution of the water-soluble alginic acid derivative may be introduced into the chemical agent for forming the water-insoluble alginate, either dropwise or by spraying. In the event that either of these methods is used, the chemical agent will generally be in liquid or gaseous form. The advantage of utilizing dropping or spraying of the mixture into the chemical agent over the reverse method of introducing the chemical agent into the mixture, is that in the former case the precipitation of the water-insoluble alginate will form a coherent mass of semi-solid water-insoluble alginate including therein the particles of the water-insoluble inorganic substance, which coherent mass will automatically be in the form of spheres or lens-shaped bodies, the size of the body depending on the size of the drop of mixture introduced into the chemical agent. These methods are equally suitable if the chemical agent is in liquid form, such as the solution of calcium chloride in water, of if the chemical agent is in gaseous form such as hydrogen chloride or hydrochloric acid vapor.

Preferably, the concentration of the water-soluble alginic acid derivative in the solution of the same is between 0.5–20% weight. Of course, when the concentration is at the upper limits, the solution will be in semi-solid gel form rather than in liquid form. This solution is preferably mixed with an amount of finely divided inorganic substance, the latter being in the form of solid particles, in the form of an aqueous suspension or in the form of a sol wherein the particles are of colloidal dimension, such that the amount of water-soluble alginic acid derivative in the final mixture is between 0.1–10%.

The use of a colloidal solution or sol of the inorganic substance is preferably accomplished by first adjusting the pH of the sol to a value between 4–7 before mixing the sol with the aqueous solution of the water-soluble alginic acid derivative. The adjustment of pH when utilizing the sol allows for completion of the process in a short period of time and with excellent yield of the final product.

The process of the present invention is particularly adaptable for the use of catalytic substances such as clay, kaolin, bentonite, feldspar, pumice, etc. to form the porous, solid bodies of these catalytic substances. It is also possible to utilize inorganic substances which in themselves are not catalysts, but which may be treated before or after drying or at another suitable stage of the process according to the process of the present invention with an active catalyst so as to be impregnated with the same, the inorganic substance therefore acting as a carrier material.

In the case wherein the inorganic substance utilized is not itself a very active catalyst or is not in an active form of the catalyst, it is possible to activate the catalytic substance either before or after drying of the coherent mass of semi-solid water-insoluble alginate having the inorganic substance distributed therethrough.

It is also desirable according to the present invention to lower the thixotropy of the aqueous solution of the water-soluble alginic acid derivative by the incorporation into the solution of a substance adapted to lower the thixotrophy of the solution or a substance to inhibit the precipitation of the soluble alginate from the solution. Any suitable substance may be utilized for this purpose such as alkalis, sodium carbonate, phosphates, polyphosphates and the like.

The formation of the solid porous body is finally accomplished by sintering the granular body obtained by drying the coherent mass of semi-solid water-insoluble alginate having the water-insoluble inorganic substance distributed therethrough at a temperature sufficiently high to burn out the water-soluble alginate and sinter together the remaining particles of the inorganic substance. Temperatures in the range of 1000° C. are generally utilized, though any temperature above the combustion temperature of the alginate and below the temperature at which the inorganic substance will be destroyed, may be utilized. The most desirable temperature is generally the sintering or calcining temperature of the inorganic substance. The drying of the semi-solid coherent mass is preferably carried out at a temperature above 100° C.

The process of the present invention is applicable to all types of insoluble inorganic substances for the formation of porous bodies thereof, though the invention is particularly suitable for inorganic substances such as silicates, kaolin, and the like, which substances may have catalytic property. For example, the process of the present invention may be utilized also with aluminas, titanates and ceramic materials of all types.

The following examples are given as illustrative of preferred embodiments according to the present invention, the scope of said invention not however being limited to the examples given.

Example 1

100 g. kaolin is mixed with 100 g. feldspar and the mixture is then further mixed with 1000 g. of a 5% solution of sodium alginate to form a slimy suspension. This suspension is by mechanical means forced through a nozzle of suitable dimension and dropped into a 25% solution of calcium chloride. Spherical bodies of calcium alginate having the kaolin and feldspar distributed therethrough are thus precipitated and after 5 minutes removed from the precipitating solution. The excess liquid is allowed to drain and the mass is then dried at a temperature above 100° C. After drying the body is then sintered at a temperature of about 1000° C. to form a hard, solid, porous body.

Example 2

A mixture of 100 g. kaolin and 100 g. feldspar is mixed with a solution of 5% sodium alginate in water, the solution also containing 1% potassium chromate or 1% copper in the form of copper-ammonium complex, to form a slimy suspension which is further treated as in Example 1.

Example 3

The mixture of 100 g. kaolin and 100 g. feldspar is mixed with 0.5% nickel oxide. This mixture is then further treated as in Example 1.

Example 4

The slimy suspension formed in Example 1 is dropped into a 5% solution of cobalt nitrate, instead of the calcium chloride solution utilized in Example 1. The semi-solid, coherent masses formed in spherical shape are then further treated as in Example 1.

Example 5

The slimy suspension produced in Example 1 is dropped by means of a nozzle of suitable size through a chamber in which a 10% solution of calcium chloride is sprayed. The semi-solid bodies formed are further treated as in Example 1.

Example 6

The dried, solidified body formed in Example 1, is either before or after sintering impregnated with an active catalyst such as chromium chloride, dried and then oxidized. If not, previously, it is then sintered.

Example 7

A precipitated aluminum silicate gel is mixed with 10% of a 5% sodium alginate solution so that a suspension of the silicate containing in solution 0.5% of sodium alginate is obtained. This suspension is dropped through a 10% hydrochloric acid solution. The semi-solid body formed is dried and sintered. The resulting body is highly porous and has excellent catalytic properties.

Example 8

100 parts by volume of a sol of 500 cc. commercial water glass in 2000 cc. water and 60 cc. of a solution of aluminum chloride containing 600 g. AlCl$_3$.6H$_2$O per liter, is treated with sufficient hydrochloric acid to adjust the pH to 4.5. This solution solidifies to a gel after standing for about 3 hours and is mixed with 25 parts by volume of a 5% solution of sodium alginate and is then dropped into a 5% solution of aluminum chloride in water. The solid pellets formed are removed from the solution after 5 minutes and further treated as in Example 1.

*Example 9*

100 g. of a precipitated silica gel is mixed with 25 g. of a 3% solution of a partial methyl ester of alginic acid and is further mixed with an additional 20 g. of water so that the resulting suspension contains 0.5% by weight of the alginic acid methyl ester. This suspension is dropped through a solution of 1.5% by weight calcium chloride. The resulting bodies are further treated as in Example 1.

Without further analysis, the foregoing will so fully reveal the gist of the present invention that others can by applying current knowledge readily adapt it for various applications without omitting features that, from the standpoint of prior art, fairly constitute essential charactertistics of the generic or specific aspects of this invention and, therefore, such adaptations should and are intended to be comprehended within the meaning and range of equivalence of the following claims.

What is claimed as new and desired to be secured by Letters Patent is:

1. A process of producing shaped solid, porous bodies, comprising the steps of mixing at least one finely divided water-insoluble inorganic substance adapted to be sintered with an aqueous solution of at least one water-soluble alginic acid derivative so as to form a suspension of said inorganic substance in said aqueous solution of said alginic acid derivative; passing drops of the thus formed mixture into an aqueous solution of a chemical agent adapted to transform said alginic acid derivative into a water-insoluble alginate, thus forming coherent semi-solid drop-shaped bodies including therein particles of said finely divided water-insoluble inorganic substance; drying said coherent semi-solid drop-shaped bodies so as to form coherent ganular drop-shaped bodies; and heating said coherent granular drop-shaped bodies to a temperature above the combustion temperature of said insoluble alginate and sufficiently high to sinter together said particles of said finely divided inorganic substance, thus burning off said alginate and forming solid porous drop-shaped bodies of said inorganic substance.

2. A process of producing shaped solid, porous bodies, comprising the steps of mixing at least one finely divided water-insoluble catalytic material adapted to be sintered with an aqueous solution of at least one water-soluble alginic acid derivative so as to form a suspension of said catalytic material in said aqueous solution of said alginic acid derivative; passing drops of the thus formed mixture into an aqueous solution of a chemical agent reactable with and adapted to transform said alginic acid derivative into a water-insoluble alginate, said chemical agent being selected from the group consisting of acids, alkali earth salts, heavy metal salts and aluminum salts, thus forming coherent semi-solid drop-shaped bodies including therein particles of said finely divided water-insoluble catalytic material; drying said coherent semi-solid drop-shaped bodies so as to form coherent granular drop-shaped bodies; and heating said coherent granular drop-shaped bodies to a temperature above the combustion temperature of said insoluble alginate and sufficiently high to sinter together said particles of said finely divided catalytic material, thus burning off said alginate and forming solid porous drop-shaped bodies of said catalytic material.

3. A process of producing shaped solid, porous bodies, comprising the steps of mixing at least one finely divided water-insoluble inorganic substance adapted to be sintered with an aqueous solution of at least one water-soluble alginic acid derivative so as to form a suspension of said inorganic substance in said aqueous solution of said alginic acid derivative; passing drops of the thus formed mixture through aqueous hydrochloric acid which is adapted to transform said alginic acid derivative into a water-insoluble alginate, thus forming coherent semi-solid drop-shaped bodies including therein particles of said finely divided water-insoluble inorganic substance; drying said coherent semi-solid drop-shaped bodies so as to form coherent granular drop-shaped bodies; and heating said coherent granular drop-shaped bodies to a temperature above the combustion temperature of said insoluble alginate and sufficiently high to sinter together said particles of said finely divided inorganic substance, thus burning off said alginate and forming solid porous drop-shaped bodies of said inorganic substance.

4. A process of producing shaped solid, porous bodies, comprising the steps of mixing at least one finely divided water-insoluble inorganic substance adapted to be sintered with an aqueous solution of at least one water-soluble alginic acid salt so as to form a suspension of said inorganic substance in said aqueous solution of said alginic acid salt; passing drops of the thus formed mixture into an aqueous solution of a soluble substance selected from the group consisting of acids, alkali earth salts, heavy metal salts and aluminum salts transforming said alginic acid salt into a water-insoluble alginate, thus forming coherent semi-solid drop-shaped bodies including therein particles of said finely divided water-insoluble inorganic substance; allowing excess liquid to drain-off; drying said coherent drop-shaped bodies at a temperature of at least 100° C. so as to form coherent granular drop-shaped bodies; and heating said coherent granular drop-shaped bodies to a temperature above the combustion temperature of said insoluble alginate and sufficiently high to sinter together said particles of said finely divided inorganic substance, thus burning off said alginate and forming solid porous drop-shaped bodies of said inorganic substance.

5. A process of producing shaped solid, porous bodies, comprising the steps of mixing at least one finely divided water-insoluble inorganic substance adapted to be sintered with an 0.5–20% aqueous solution of at least one water-soluble alginic acid derivative in amounts such that the final mixture contains between 0.1 and 10% of said water-soluble alginic acid derivative so as to form a suspension of said inorganic substance in said aqueous solution of said alginic acid derivative; passing drops of said suspension into an aqueous solution of a chemical agent reactable with and adapted to transform said alginic acid derivative into a water-insoluble alginate, said chemical agent being selected from the group consisting of acids, alkali earth salts, heavy metal salts and aluminum salts, thus forming coherent semi-solid drop-shaped bodies including therein particles of said finely divided water-insoluble inorganic substance; allowing excess liquid to drain-off; drying said coherent drop-shaped bodies at a temperature of at least 100° C. so as to form coherent granular drop-shaped bodies; and heating said coherent granular drop-shaped bodies to a temperature above the combustion temperature of said insoluble alginate and sufficiently high to sinter together said particles of said finely divided inorganic substance, thus burning off said alginate and forming solid porous drop-shaped bodies of said inorganic substance.

6. A process of producing shaped solid, porous bodies, comprising the steps of mixing an aqueous suspension of at least one finely divided water-insoluble inorganic substance adapted to be sintered with an aqueous solution of at least one water-soluble alginic acid derivative so as to form a suspension of said inorganic substance in said aqueous solution of said alginic acid derivative; passing drops of said suspension into an aqueous solution of a chemical agent reactable with and adapted to transform said alginic acid derivative into a water-insoluble alginate, said chemical agent being selected from the group consisting of acids, alkali earth salts, heavy metal salts and aluminum salts, thus forming coherent semi-solid drop-shaped bodies including therein particles of said finely divided water-insoluble inorganic substance; allowing excess liquid to drain-off; drying said coherent drop-shaped bodies at a temperature of at least 100° C. so as to form coherent granular drop-shaped bodies; and heating said coherent granular drop-shaped bodies to a temperature above the combustion temperature of said insoluble alginate and sufficiently high to sinter together said particles of said finely divided inorganic substance, thus burning off said alginate and forming solid porous drop-shaped bodies of said inorganic substance.

7. A process of producing shaped solid, porous bodies, comprising the steps of forming a sol of at least one colloidal inorganic substance adapted to be sintered in water at a pH of 4–7; mixing said sol with an aqueous solution of at least one water-soluble alginic acid derivative so as to form a mixture of said colloidal inorganic substance and said aqueous solution of said alginic acid derivative; passing drops of the thus formed mixture into an aqueous solution of a chemical agent reactable with and adapted to transform said alginic acid derivative into a water-insoluble alginate, said chemical agent being selected from the group consisting of acids, alkali earth salts, heavy metal salts and aluminum salts, thus forming coherent semi-solid drop-shaped bodies including therein particles of said colloidal water-insoluble inorganic substance; drying said coherent semi-solid drop-shaped bodies so as to form coherent granular drop-shaped bodies; and heating said coherent granular drop-shaped bodies to a temperature above the combustion temperature of said insoluble alginate and sufficiently high to sinter together said colloidal particles of said finely divided inorganic substance, thus burning off said alginate and forming solid porous drop-shaped bodies of said inorganic substance.

8. A process of producing shaped solid, porous bodies, comprising the steps of mixing at least one finely divided water-insoluble inorganic substance adapted to be sintered with an aqueous solution of at least one water-soluble alginic acid derivative and containing in solution at least one substance adapted to lower the thixotropy of said aqueous solution of said water-soluble alginic acid derivative so as to form a suspension of said inorganic substance in said aqueous solution of said alginic acid derivative; passing drops of said suspension into an aqueous solution of a chemical agent reactable with and adapted to transform said alginic acid derivative into a water-insoluble alginate, said chemical agent being selected from the group consisting of acids, alkali earth salts, heavy metal salts and aluminum salts, thus forming coherent semi-solid drop-shaped bodies including therein particles of said finely divided water-insoluble inorganic substance; drying said coherent semi-solid drop-shaped bodies so as to form coherent granular drop-shaped bodies; and heating said coherent granular drop-shaped bodies to a temperature of at least 1000° C. being above the combustion temperature of said insoluble alginate and sufficiently high to sinter together said particles of said finely divided inorganic substance, thus burning off said alginate and forming solid porous drop-shaped bodies of said inorganic substance.

References Cited in the file of this patent

UNITED STATES PATENTS

| | | |
|---|---|---|
| 1,351,087 | Sutter | Aug. 31, 1920 |
| 1,415,850 | Erdahl | May 9, 1922 |
| 1,654,099 | Shiraishi | Dec. 27, 1927 |
| 2,317,803 | Reeves et al. | Apr. 27, 1943 |
| 2,535,647 | Millman et al. | Dec. 26, 1950 |
| 2,639,268 | Heiss | May 19, 1953 |